United States Patent [19]

Bykhovsky

[11] 4,001,461
[45] Jan. 4, 1977

[54] METHOD OF PRODUCING ELECTRODE UNITS FOR PLASMATRONS

[76] Inventor: David Grigorievich Bykhovsky, Konjushenny pereulok 1/6, kv. 18, Leningrad, U.S.S.R.

[22] Filed: Mar. 30, 1973

[21] Appl. No.: 346,661

[52] U.S. Cl. .................................. 427/37; 427/47; 427/123; 427/295; 427/431; 427/432; 427/436; 219/76; 219/130; 204/290 R

[51] Int. Cl.² ...................... B23K 9/04; B23K 9/00

[58] Field of Search ............. 117/114 R, 227, 230, 117/93.1 R; 13/26, 27; 29/592; 204/290 R; 219/76, 130; 427/37, 123, 319, 431, 436, 432, 295, 47

[56] References Cited

UNITED STATES PATENTS

| | | | |
|---|---|---|---|
| 2,755,369 | 7/1956 | Shrubsall | 117/93.1 R |
| 3,020,323 | 2/1962 | Redfern | 13/27 |
| 3,518,109 | 6/1970 | Halley | 117/114 R |
| 3,582,604 | 6/1971 | Bykhovsky | 219/121 |
| 3,659,075 | 4/1972 | Pellkofer | 219/76 |
| 3,920,948 | 11/1975 | Schokkenbroek | 219/76 |
| 3,922,516 | 11/1975 | Valtchev | 219/76 |

FOREIGN PATENTS OR APPLICATIONS 1,255,809    12/1971    United Kingdom ............ 117/227

Primary Examiner—Michael F. Esposito

[57] ABSTRACT

A method of producing electrode units for plasmatrons, according to which a direct-current arc is struck between a tungsten electrode and a melt, so that the electrode acts as a cathode, prior to dipping the electrode into the molten metal, intended e.g. for an electrode holder. Then the electrode is dipped into the melt, and the arc is extinguished.

4 Claims, 6 Drawing Figures

METHOD OF PRODUCING ELECTRODE UNITS FOR PLASMATRONS

The present invention relates to plasma techniques and may prove most advantageous in metallurgy, welding, building up of metals, etc.

The best material for the production of electrodes for plasmatrons of direct and reverse polarity is tungsten, the electrodes being designed for operation in inert or neutral gases.

In this case the maximum permissible current magnitudes are determined by the electrode cooling rate. When operating with direct polarity (with the tungsten electrode acting as a cathode) heat flow to the cathode is comparatively small. Therefore with currents of several hundreds of amperes, ordinary grippers secured in a water-cooled electrode holder will suffice. A large number of plasmatron electrode units are based on the above principle.

When using nitrogen-hydrogen mixtures and heavy currents, a more intense cooling of the electrode is necessary, this being achieved by the known method of producing electrode units, wherein the tungsten electrode is soldered into a water-cooled copper electrode holder.

However, even the above-described arrangement does not offer a considerable increase in the current magnitude. This can be explained as follows. To increase heat transfer from the working face of the tungsten electrode, it is necessary to reduce the span. However with a reduced span, the joint between the tungsten electrode and the copper electrode becomes the most vulnerable place, and the metal starts fusing along the joint. In this case the tungsten, if soldered, will fall out of the electrode holder since the solder will melt out.

Hence, the available methods of producing electrode units do not offer a substantial increase in the permissible current magnitudes. While in direct-polarity plasmatrons this leads only to a certain reduction in the efficiency of the plasmatron, with reverse-polarity plasmatrons inadequate conditions of heat transfer do not allow using the tungsten electrodes in general because in this circuit the heat flow to the electrodes is greater by 8 to 10 times than with direct polarity.

Also known is a method of manufacturing electrode units of plasmatrons by melting the metal intended for the electrode holder and dipping the tungsten electrode into the melt produced.

However, oxide films formed on the surface of the tungsten electrode do not afford a good contact between the tungsten and the metal of the electrode holder.

The object of the present invention is to provide a method of producing electrode units for plasmatrons which ensure adequate contact between the tungsten electrode and the material of the electrode holder.

Another object of the invention is to ensure the highest possible cooling rate of the tungsten electrodes.

A further object of the invention is to simplify the process of melting the metal from which the electrode holder is made.

Yet another object of the invention is to preclude the ingress of undesirable admixtures into the melt.

These and other objects of the invention are accomplished by providing a method of producing electrode units for plasmatrons which comprises the steps of melting metal intended for molding an electrode holder and dipping a tungsten electrode into the melt, wherein, according to the invention, prior to the dipping of the electrode, a direct-current arc is striken between the latter and the electrode, so that the electrode serves as a cathode, the arc being extinguished after the electrode has been dipped into the melt.

The above method offers more adequate contact between the tungsten electrode and the metal of the electrode holder.

According to the invention, in order to simplify the process, the direct-current arc may be utilized for melting the metal intended for the electrode holder.

In accordance with the invention, prior to dipping the electrode into the melt, an independently adjustable magnetic field is created around the melt, interacting with the arc current and causing thereby the melt to rotate, with the formation of a vortex funnel which ensures arcing from the cylindrical surface of the electrode, the magnitude of the magnetic field being gradually reduced to zero after the electrode has been dipped into the melt.

Owing to this, uniform dressing of both the face and the cylindrical surface of the tungsten electrode becomes possible.

According to the invention, the electrode may be dipped into the melt in a controllable medium of inert gases. This precludes the ingress of undesirable admixtures into the melt.

Moreover, in accordance with the present invention, the electrode may be dipped into the melt in the controllable medium of inert gases under a decreased pressure. This makes it possible to reduce the effect of admixtures enclosed in the inert medium employed.

The present invention will be better understood from a consideration of a detailed description of an exemplary embodiment thereof, in conjunction with the accompanying drawings, wherein.

Figure 1:
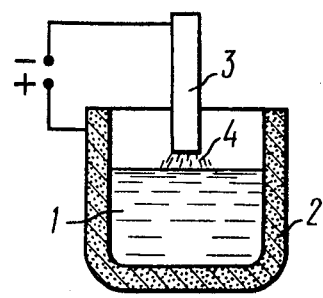
FIG. 1 shows a crucible with molten metal therein, above which an electrode is arranged, for performing therewith the method according to the invention.

A metal 1 (FIG. 1), intended for an electrode holder, for instance copper, silver or some other heat-conducting material, is placed in a graphite crucible 2.

A direct-current arc 4 is striken between a tungsten electrode 3 and the metal 1 by conventional expedients. In this case the tungsten electrode 3 is the cathode. Under the effect of heat liberated in the arc 4 and especially in its anodic region, the metal 1 is fused or melted in the usual manner. At the same time the tungsten electrode 3, acting as a cathode, is subject to intense cathode dressing.

Figure 2:
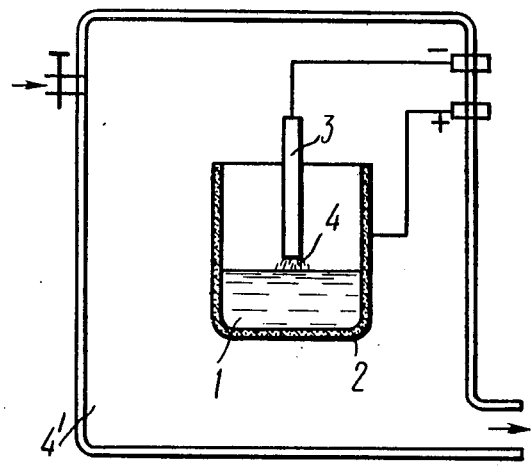
FIG. 2 shows the same set-up as FIG. 1 but placed in an air- or gas-tight chamber, for further embodying features according to the invention.

To prevent oxidation of the metal the entire process is preferably performed in a controllable inert medium. In case the requisite purifying of the inert medium can be not feasible, the pressure in the working space is reduced. For this purpose the crucible 2 with the molten metal 1 and the tungsten electrode 3 are placed in an enclosed chamber 4' (FIG. 2) connected to a vacuum pump.

After the metal 1 has been melted (FIG. 1) the tungsten electrode 3 is dipped into the melt without switching off the arc, and only then is the current turned off.

With the above flow of the process the cathode dressing of the face of the tungsten electrode 3 is effected in a most thorough way, with its cylindrical surface being dressed slightly worse. To ensure simultaneous dressing of both the face and the cylindrical surface of the electrode, the crucible 2 (FIG. 3) is placed inside a solenoid 5 along which the current is passed, with the current magnitude being adjustable independently of the current of the arc 4.

Figure 3:
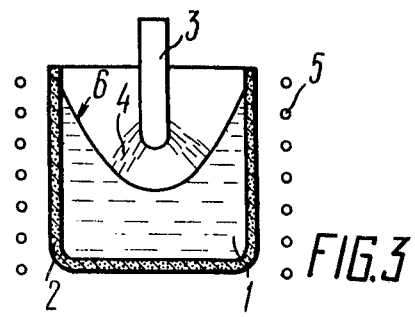
FIG. 3 depicts the crucible with molten metal placed inside a solenoid, also for realizing the method according to the invention.

As a result of interaction between the arc current and the field of the solenoid 5, the arc commences to rotate. At the same time the molten metal 1 also starts rotating, forming a vortex funnel 6 (FIG. 3). This results in an intense cathode dressing of the cylindrical surface of the tungsten electrode 3 as well, which provides ultimately, upon dipping the tungsten electrode 3 into the molten metal 1 (copper, silver), an ideal contact between the entire contact surface of tungsten 3 and metal 1.

Upon dipping the tungsten electrode 3 into the molten metal 1 and switching off the current, the molten metal 1 continues to rotate due to inertia, with the speed of rotation gradually diminishing. As the speed of rotation of the metal 1 is decreased, the depth of the vortex funnel 6 around the electrode 3 is gradually reduced, with the metal 1 envelopping little by little the tungsten electrode 3, which also contributes to a uniform contact between the tungsten 3 and the metal 1 along the entire contact surface.

The possibility of altering the level of the molten bath at the center by changing the magnitude of the magnetic field may be utilized in the following manner. After the arc 4 has been striken and the metal 1 melted, the winding of the solenoid 5 is energized, with the current magnitude being established in accordance with the required depth of the funnel 6. Then the tungsten electrode 3 is lowered without striking the arc 4 so that a gap is maintained between the bottom of the funnel 6 and the face of the electrode 3.

Figure 4:
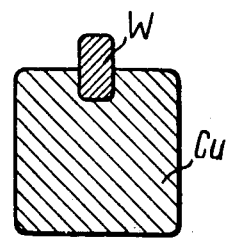
FIGS. 4, 5, 6 depict electrode units produced by the method of the invention and having different geometry.
Figure 5:
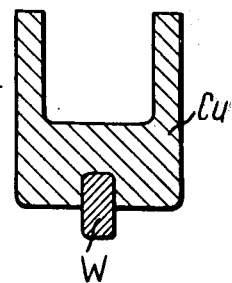

After that, the current in the winding of the solenoid 5 is decreased with the stationary tungsten electrode 3. As a result the depth of the funnel 6 is gradually reduced and, at a certain value of the current flowing through the winding of the solenoid 5 the electrode 3 will become submerged in the molten metal 1. On being completely cooled, the blank produced (FIG. 4) is machined to obtain the requisite geometry. Thus, an electrode unit illustrated in FIG. 5 can be fabricated.

Figure 6:
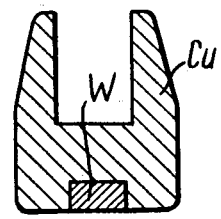

An electrode unit intended for use in reverse-polarity plasmatrons constitutes, upon machining, a part shown in FIG. 6.

Hence, the major advantage of the herein-proposed method of producing electrode units for plasmatrons consists in that it provides an ideal contact between tungsten and copper over the entire surface of the joint, irrespective of the shape of the electrode, which offers the possibility of using the electrodes with configurations that can ensure the most intense heat absorption.

The use of the proposed method of producing electrode units makes it possible to provide the highest density of specific heat flow into the welding bath, along with an intense destruction of oxide films when welding and building-up structures in aluminium and magnesium and their alloys. The inventive method ensures ultimately a combination of maximum process rates and of a high quality of the welded joints.

We claim:

1. In a method of producing electrode units for plasmatrons, which includes the melting of metal intended for molding an electrode holder, providing a tungsten electrode for melting the metal by the aid of a D-C arc, dipping the electrode into the melt, and withdrawing the electrode and the solidified metal as an electrode unit, the improvement comprising the steps of using the tungsten electrode to act as a cathode; striking the arc prior to the electrode dipping step; maintaining the arc while the electrode is in the melt; and extinguishing the arc after the dipping step but before the withdrawal of the electrode unit.

2. The method as defined in claim 1, further comprising the step of creating the independently adjustable magnetic field around the melt; prior to the electrode dipping step, causing the melt to rotate by the interaction of the magnetic field with the current of the arc; causing the formation of a vortex funnel which ensures arcing from a cylindrical surface of a electrode; and gradually reducing to zero the magnitude of the magnetic field during the electrode dipping step.

3. The method as defined in claim 1, further comprising the steps of providing a closable chamber in which the method is performed, and providing a controllable medium of inert gases in the chamber at substantially atmospheric pressure, the electrode dipping step being performed in that medium.

4. The method as defined in claim 3, further comprising the step of decreasing the pressure of the inert gases during the electrode dipping step by providing a vacuum in the chamber.

* * * * *